(12) United States Patent
Richardson, Jr.

(10) Patent No.: US 8,439,311 B2
(45) Date of Patent: May 14, 2013

(54) AERIAL REFUELING BOOM AND BOOM PIVOT

(75) Inventor: Forrest E. Richardson, Jr., Wichita, KS (US)

(73) Assignee: The Boeing Company, Chicago, IL (US)

(*) Notice: Subject to any disclaimer, the term of this patent is extended or adjusted under 35 U.S.C. 154(b) by 327 days.

(21) Appl. No.: 12/861,090

(22) Filed: Aug. 23, 2010

(65) Prior Publication Data

US 2012/0043423 A1 Feb. 23, 2012

(51) Int. Cl.
*B64D 39/00* (2006.01)

(52) U.S. Cl.
USPC ........................................................ 244/135 A

(58) Field of Classification Search .............. 244/135 A, 244/135 R
See application file for complete search history.

(56) References Cited

U.S. PATENT DOCUMENTS

| | | | |
|---|---|---|---|
| 2,663,523 A | 12/1953 | Leisy | |
| 2,859,002 A | 11/1958 | Leisy | |
| 2,960,295 A | 11/1960 | Schulze | |
| 4,072,283 A * | 2/1978 | Weiland | 244/135 A |
| 4,129,270 A * | 12/1978 | Robinson et al. | 244/135 A |
| 4,586,683 A * | 5/1986 | Kerker | 244/135 A |
| 5,388,935 A | 2/1995 | Sheldon | |
| 5,466,085 A | 11/1995 | Sheldon et al. | |
| 5,489,168 A | 2/1996 | Sheldon et al. | |
| 5,538,373 A | 7/1996 | Kirkham | |
| 5,785,276 A | 7/1998 | Ruzicka | |
| 5,906,336 A * | 5/1999 | Eckstein | 244/135 A |
| 5,940,180 A | 8/1999 | Ostby | |
| 5,996,939 A * | 12/1999 | Higgs et al. | 244/135 A |
| 6,598,830 B1 * | 7/2003 | Ambrose et al. | 244/135 A |
| 7,147,186 B2 | 12/2006 | Adelson | |
| 7,188,807 B2 | 3/2007 | Smith | |
| 7,213,787 B2 | 5/2007 | Carns et al. | |

(Continued)

FOREIGN PATENT DOCUMENTS

| | | |
|---|---|---|
| EP | 1 762 492 A2 | 3/2007 |
| EP | 1 980 488 A2 | 10/2008 |

(Continued)

OTHER PUBLICATIONS

European Patent Office, PCT International Search Report and Written Opinion for International Application No. PCT/US2011/044179 dated Feb. 16, 2012.

(Continued)

*Primary Examiner* — Tien Dinh
*Assistant Examiner* — Keith L Dixon
(74) *Attorney, Agent, or Firm* — Charles L. Moore; Moore & Van Allen PLLC

(57) ABSTRACT

An aerial refueling boom may include a refueling boom assembly and a pivot assembly for attaching the aerial refueling boom to a tanker aircraft. The refueling boom assembly may include a main boom section and a hollow telescoping boom section. The hollow telescoping boom section is adapted to be moved between a retracted position within the main boom section and an extended position extending from the main boom section for in-flight refueling of an aircraft. The pivot assembly may include an aircraft attachment plate to attach the pivot assembly to the tanker aircraft and a refueling boom attachment plate to attach the refueling boom assembly to the pivot assembly. The pivot assembly may also include a plurality of actuators pivotably coupling the aircraft attachment plate to the refueling boom attachment plate.

24 Claims, 9 Drawing Sheets

U.S. PATENT DOCUMENTS

| | | |
|---|---|---|
| 7,219,857 B2 | 5/2007 | Takacs et al. |
| 7,246,774 B2 | 7/2007 | Von Thal et al. |
| 7,293,741 B2 | 11/2007 | Carns et al. |
| 7,298,291 B2 | 11/2007 | von Thal et al. |
| 7,309,047 B2 | 12/2007 | Crangle et al. |
| 7,309,048 B2 | 12/2007 | von Thal et al. |
| 7,431,241 B2 | 10/2008 | Adelson |
| 7,458,543 B2 | 12/2008 | Cutler et al. |
| 7,469,863 B1 | 12/2008 | Speer |
| 7,472,868 B2 * | 1/2009 | Schuster et al. .......... 244/135 A |
| 7,533,850 B2 | 5/2009 | Carns et al. |
| 7,581,700 B2 | 9/2009 | Carns et al. |
| 7,637,458 B2 | 12/2009 | Near et al. |
| 7,665,479 B2 | 2/2010 | Cutler et al. |

FOREIGN PATENT DOCUMENTS

| | | |
|---|---|---|
| GB | 724092 | 2/1955 |
| GB | 765424 | 1/1957 |
| WO | 2010/059155 A1 | 5/2010 |

OTHER PUBLICATIONS

Gough, V.E., et al., "Universal Tyre Test Machine", Proceedings Ninth International Technical Congress F.I.S.I.T.A. May 1962, pp. 117-137.

Stewart, D., "A Platform with Six Degrees of Freedom", The Institute of Mechanical Engineers Proceedings 1965-66, vol. 180, No. 15, pt. 1, pp. 371-386.

* cited by examiner

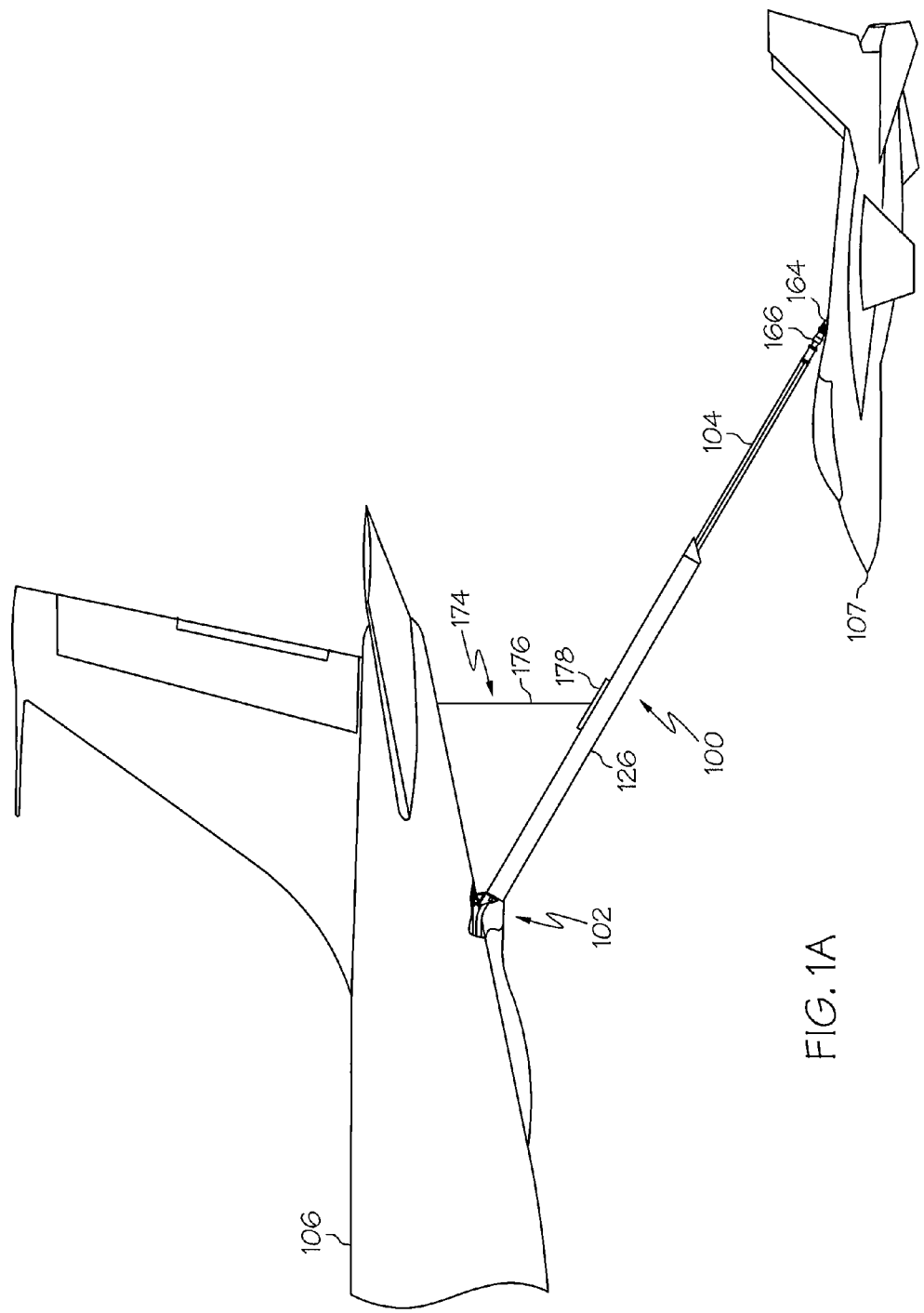

AERIAL REFUELING BOOM AND BOOM PIVOT

FIELD

The present disclosure relates to aerial refueling booms for in-flight refueling of aircraft, and more particularly to an aerial refueling boom and boom pivot with enhanced roll capability and multiple degrees of freedom of motion.

BACKGROUND

Air refueling tankers utilize two basic methods for the transference of fuel from the tanker aircraft to the receiving aircraft. One method involves the tanker aircraft extending a drogue equipped flexible hose which the receiving aircraft plugs into via a refueling probe. For the most part, the hose and drogue is a passive system in regards to the tanker, in that once the tanker has extended the hose, no control inputs for drogue position are available from the tanker. This method is typically limited to fairly low flow rates of transference.

For higher fuel transfer rates, tanker aircraft typically employ a refueling boom. This refueling boom consists of a telescoping tube assembly which plugs into a receptacle on the receiving aircraft. All refueling booms in current use utilize airfoil control surfaces mounted on the refueling boom to move the boom throughout its operational envelope, e.g. up-down, side-to-side. The size and shape of these control surfaces are determined by the amount of force they must generate to overcome the boom aerodynamic drag. Current refueling booms typically have cross-sections which are elongated in the forward-aft direction, such that they expose a more streamlined shape to the airflow when the boom is trailing behind the tanker aircraft in flight, and the boom is located on the aircraft centerline. Side-to-side movement of the refueling boom exposes a profile with greater surface area to the on-coming airflow, thus increasing the aerodynamic drag on the boom, and as a consequence, the amount of force needed from the airfoil control surfaces to overcome that drag.

In order to mount the refueling boom to the tanker aircraft, various boom pivot configurations have been developed, e.g. alti-azimuth, canted axis, rolling axis, each of which attempt to minimize the refueling boom cross-section during movement in order to decrease aerodynamic drag. With all of these pivot configurations, however, a point is reached wherein the force generated by the airfoil control surfaces cannot further overcome the aerodynamic drag of the refueling boom due to the structural limitations of the refueling boom structure.

SUMMARY

In accordance with an embodiment, an aerial refueling boom may include a refueling boom assembly and a pivot assembly for attaching the aerial refueling boom to a tanker aircraft. The refueling boom assembly may include a main boom section and a hollow telescoping boom section. The hollow telescoping boom section is adapted to be moved between a retracted position within the main boom section and an extended position extending from the main boom section for in-flight refueling of an aircraft. The pivot assembly may include an aircraft attachment plate to attach the pivot assembly to the tanker aircraft. The pivot assembly may also include a refueling boom attachment plate to attach the refueling boom assembly to the pivot assembly. The pivot assembly may further include a plurality of actuators pivotably coupling the aircraft attachment plate to the refueling boom attachment plate. Each actuator may include a first end pivotably attached to the aircraft attachment plate and a second end pivotably attached to the refueling boom attachment plate. Each actuator may be independently controlled to vary a length of each actuator to provide multiple degrees of freedom of motion of the aerial refueling boom.

In accordance with another embodiment, an aerial refueling boom may include a pivot assembly for attaching the aerial refueling boom to a tanker aircraft. The aerial refueling boom may also include a refueling boom assembly. The refueling boom assembly may include a main boom section and a hollow telescoping boom section. The telescoping boom section may be adapted to be moved between a retracted position within the main boom section and an extended position extending from the main boom section for in-flight refueling of an aircraft. The main boom section may include a plurality of outer longitudinal stiffeners extending linearly along a length of the main boom section. The main boom section may also include a plurality of structural bulkheads positioned at predetermined locations along the length of the main boom section. Each structural bulkhead may include a center opening through which the telescoping boom section is moveable. Each of the plurality of outer longitudinal stiffeners may be attached to each of the structural bulkheads.

In accordance with another embodiment, an aerial refueling boom may include a refueling boom assembly and a pivot assembly for attaching the aerial refueling boom to a tanker aircraft. The refueling boom assembly may include a main boom section and a hollow telescoping boom section. The telescoping boom section may be adapted to be moved between a retracted position within the main boom section and an extended position extending from the main boom section for in-flight refueling of an aircraft. The refueling boom may also include an offset adapter to provide a structural interface between the pivot assembly and the refueling boom assembly. The offset adapter may include a structure to allow the pivot assembly to be attached substantially horizontally to the tanker aircraft.

In accordance with another embodiment, a method for in-flight refueling of an aircraft may include pivoting a refueling boom assembly into a selected position for in-flight refueling of the aircraft. The method may also include selecting the selected position for in-flight refueling by independently adjusting a length of each of a plurality of actuators of a pivot assembly attaching the refueling boom assembly to a tanker aircraft. The method may additionally include extending a hollow telescoping boom section from a main boom section of the refueling boom assembly. The hollow telescoping boom section may include a refueling nozzle attached to an aft end of the telescoping boom section. The refueling nozzle may be adapted to releasably couple the telescoping boom section to a fuel receptacle of the aircraft to be refueled in-flight.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

FIG. 1A is an example of an aerial refueling boom and boom pivot assembly illustrating the refueling boom with a telescoping boom section in an extended position for in-flight refueling of an aircraft in accordance with an embodiment of the present disclosure.

DESCRIPTION

The following detailed description of embodiments refers to the accompanying drawings, which illustrate specific embodiments of the disclosure. Other embodiments having different structures and operations do not depart from the scope of the present disclosure.

Figure 1B:
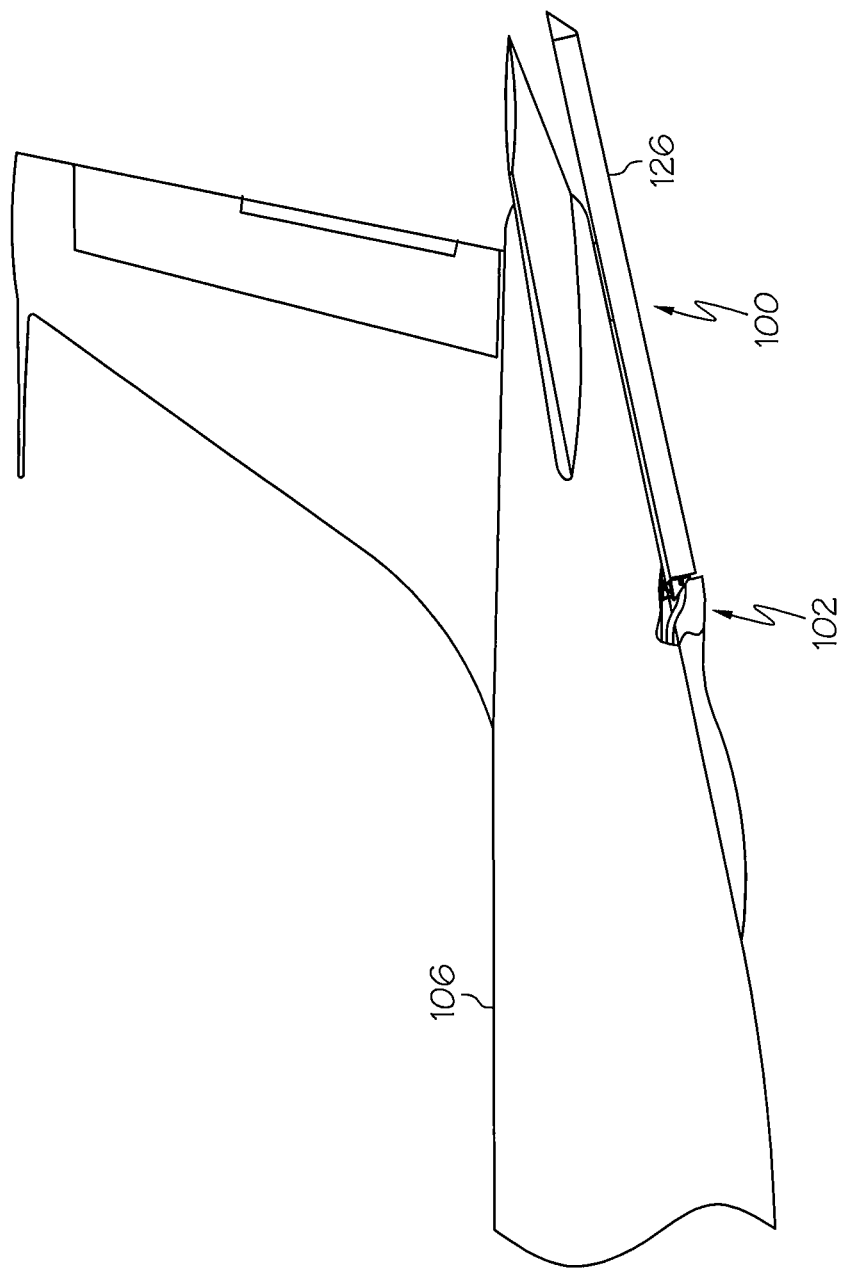
FIG. 1B is an example of an aerial refueling boom and boom pivot assembly illustrating the refueling boom with the telescoping boom section in a retracted or stowed position in accordance with an embodiment of the present disclosure.

FIG. 1A is an example of an aerial refueling boom 100 and boom pivot assembly 102 illustrating the refueling boom 100 with a telescoping boom section 104 in an extended position from a tanker aircraft 106 for in-flight refueling of another aircraft 107 in accordance with an embodiment of the present disclosure. FIG. 1B is an example of the aerial refueling boom 100 and boom pivot assembly 102 illustrating the refueling boom 100 with the telescoping boom section 104 in a retracted or stowed position and the refueling boom 100 being positioned adjacent the tanker aircraft 106 in accordance with an embodiment of the present disclosure.

Figure 2:
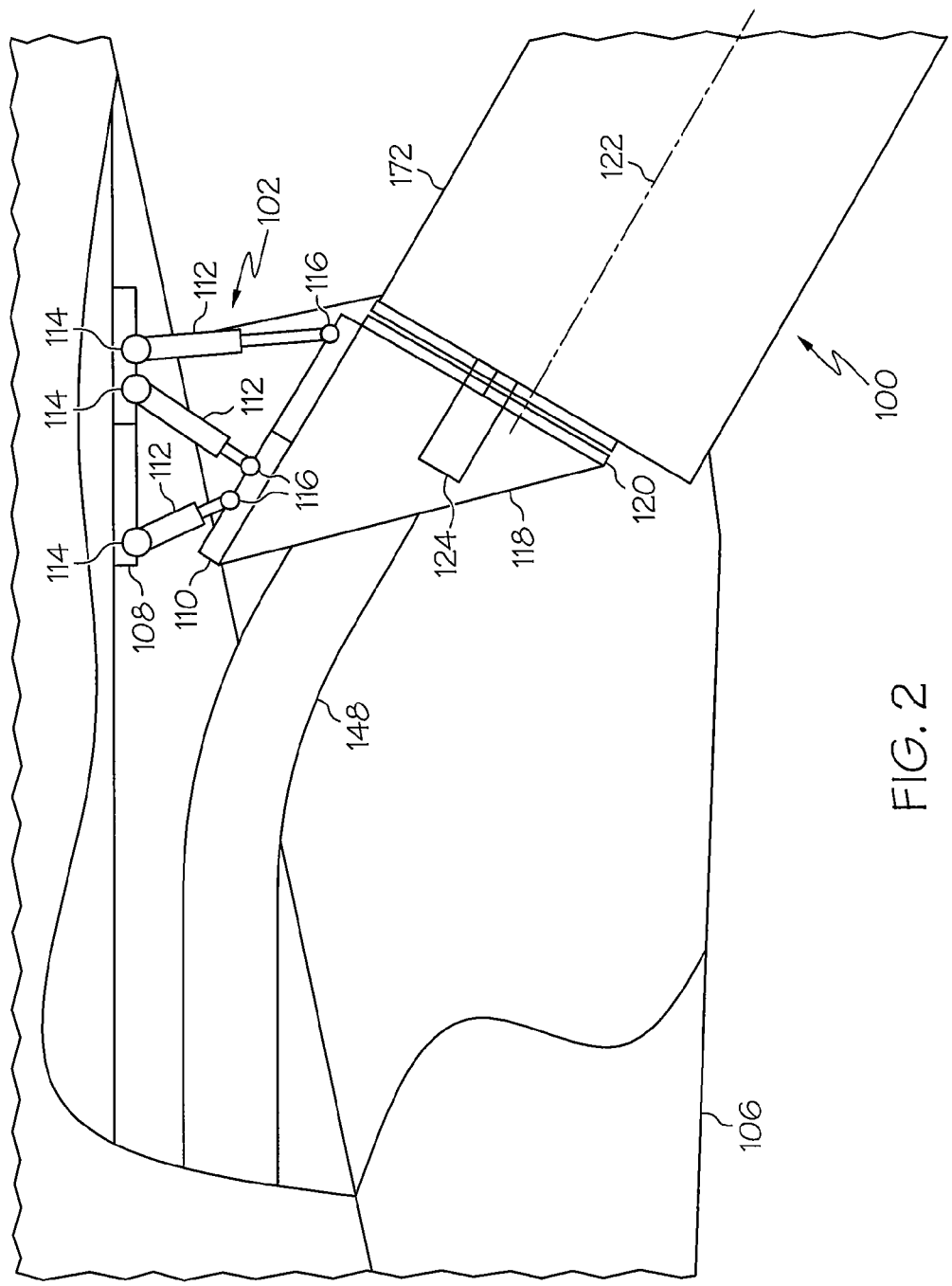
FIG. 2 is a detailed side elevation view of the boom pivot assembly of FIGS. 1A and 1B in accordance with an embodiment of the present disclosure.

Referring also to FIG. 2, FIG. 2 is a detailed side elevation view of the boom pivot assembly 102 of FIGS. 1A and 1B in accordance with an embodiment of the present disclosure. The pivot assembly 102 is adapted for attaching the aerial refueling boom 100 to a tanker aircraft 106 and to provide multiple degrees of freedom of motion of the aerial refueling boom 100 as described herein. The pivot assembly 102 may include an aircraft attachment plate 108 to attach the pivot assembly 102 and the refueling boom assembly 100 to the tanker aircraft 106. The pivot assembly 102 may also include a refueling boom attachment plate 110 to attach the refueling boom assembly 100 to the pivot assembly 102. A plurality of actuators 112 may pivotably couple the aircraft attachment plate 108 to the refueling boom attachment plate 110. Each actuator 112 may include a first end 114 pivotably attached to the aircraft attachment plate 108 and a second end 116 pivotably attached to the refueling boom attachment plate 110. Each actuator 112 may be independently controllable to vary a length of the actuator 112 to provide multiple degrees of freedom of motion of the aerial refueling boom 100.

The pivot assembly 102 may include six actuators 112 to provide six degrees of freedom of motion of the aerial refueling boom 100. Only three actuators 112 are shown in FIG. 2 for purposes of clarity. The length of each actuator 112 is variable to provide movement of the refueling boom 100 in both azimuth and elevation about a virtual pivot point.

As previously described, all refueling booms in current use utilize airfoil control surfaces mounted on the refueling boom to move the boom throughout its operational envelope, e.g. up-down, side-to-side. The airfoil control surfaces are typically mounted on either side of the refueling boom proximate a trailing end of the refueling boom. The size and shape of these control surfaces are determined by the amount of force they must generate to overcome the boom aerodynamic drag when deployed for refueling another aircraft. The pivot assembly 102 of the present disclosure may be configured to provide for movement of the refueling boom 100 exclusive of the forces generated by any airfoil control surfaces. Accordingly, the pivot assembly 102 may be configured to eliminate a need for airfoil control surfaces being attached to the aerial refueling boom 100 as in current refueling booms.

The actuators 112 may each be any type of device or mechanical apparatus whose length may be individually, selectively varied or adjusted to provide multiple degrees of freedom of movement of the refueling boom 100. The actuators 112 may be hydraulic, electric, pneumatic or some other means for selectively varying or adjusting the length of each actuator 112. The operating means of the actuators 112 may depend upon the available capabilities of the tanker aircraft 106.

A swivel fitting may be mounted on each end 114 and 116 of each actuator 112 to respectively pivotably connect each actuator 112 between the aircraft attachment plate 108 and the refueling boom attachment plate 110. The actuators 112 may be attached to each of the attachment plates 108 and 110 in a predetermined pattern to provide the desired degrees of freedom of motion. For example, the aircraft attachment plate 108 and the refueling boom attachment plate 110 may each be substantially circular in shape. The actuators 112 may be attached to each plate 108 and 110 equal distance around a circumference of each plate 108 and 110 proximate to an outer edge of each plate 108 and 110.

The aerial refueling boom 100 may also include an offset adapter 118 to provide a structural interface between the pivot assembly 102 and the refueling boom assembly 100. The offset adapter 118 may include a structure to allow the aircraft attachment plate 108 to be attached substantially horizontally to the tanker aircraft 106. The offset adapter 108 may be substantially triangular in shape or cross-section or some other shape. The offset adapter 108 has a predetermined shape or structure to provide the necessary offset depending upon the configuration of the tanker aircraft 106 to permit attachment of the aircraft attachment plate 108 to the fuselage of the tanker aircraft 106 so that the actuators 112 of the pivot assembly 102 can provide the desired degrees of freedom of motion and the greatest possible operating envelope of the refueling boom 100.

The aerial refueling boom 100 may also include a roller bearing 120 to couple the refueling boom assembly 100 to the offset adapter 118. The roller bearing 120 may allow the aerial refueling boom 100 to rotate about a roll axis 122 of the aerial refueling boom 100. The roll axis 122 of the aerial refueling boom 100 may extend through a centerline of a longitudinal extent of the refueling boom 100. A roller bearing actuator 124 may mechanically coupled to the roller bearing 120 to rotate the aerial refueling boom about the roll axis 122 of the aerial refueling boom 100.

The offset six degrees of freedom provided by the offset adapter 118 and pivot assembly 102 with the integral roll bearing 120 accomplishes movement of the aircraft refueling boom 100 by extension and retraction of the six actuators 112 in concert with rotation about the pivot roll axis 122. By varying each actuator's length 112, motion is created which will move the refueling boom 100 in both azimuth and elevation about a virtual pivot point. In addition, movement about the roll axis 122 of the boom 100 is accomplished by activation of the associated roller bearing actuator 124. These components provide control that further permits elimination the need for airfoil control surfaces, airfoil actuators and associated pantographing mechanisms associated with conventional refueling booms. The integral roller bearing 120 permits the refueling boom's envelope of operation to be substantially increased in size or scope for enhanced operational capability relative to conventional refueling booms.

Figure 3A:
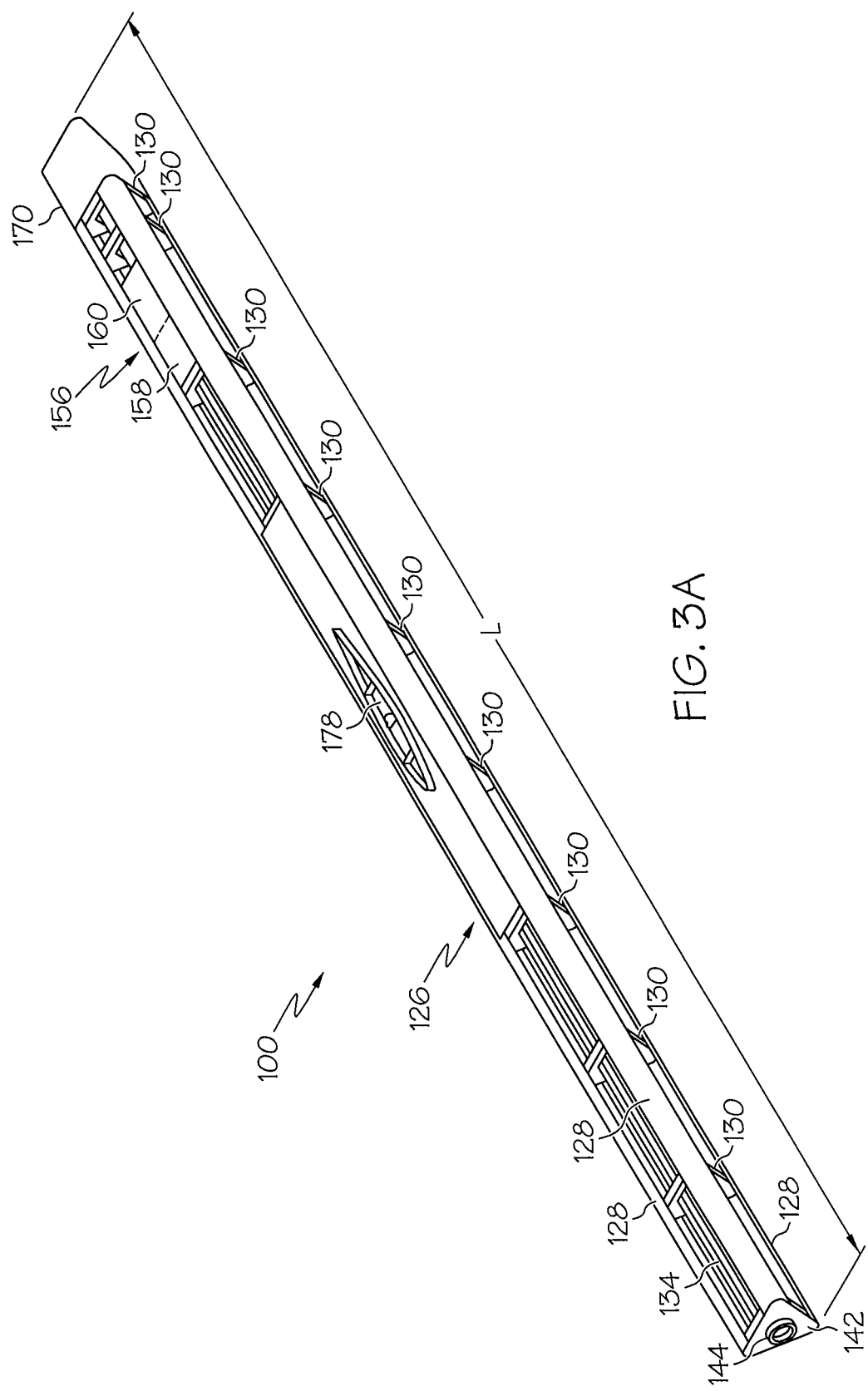
FIG. 3A is a detailed perspective view of the refueling boom with the telescoping boom section in a retracted position in accordance with an embodiment of the present disclosure.
Figure 3B:
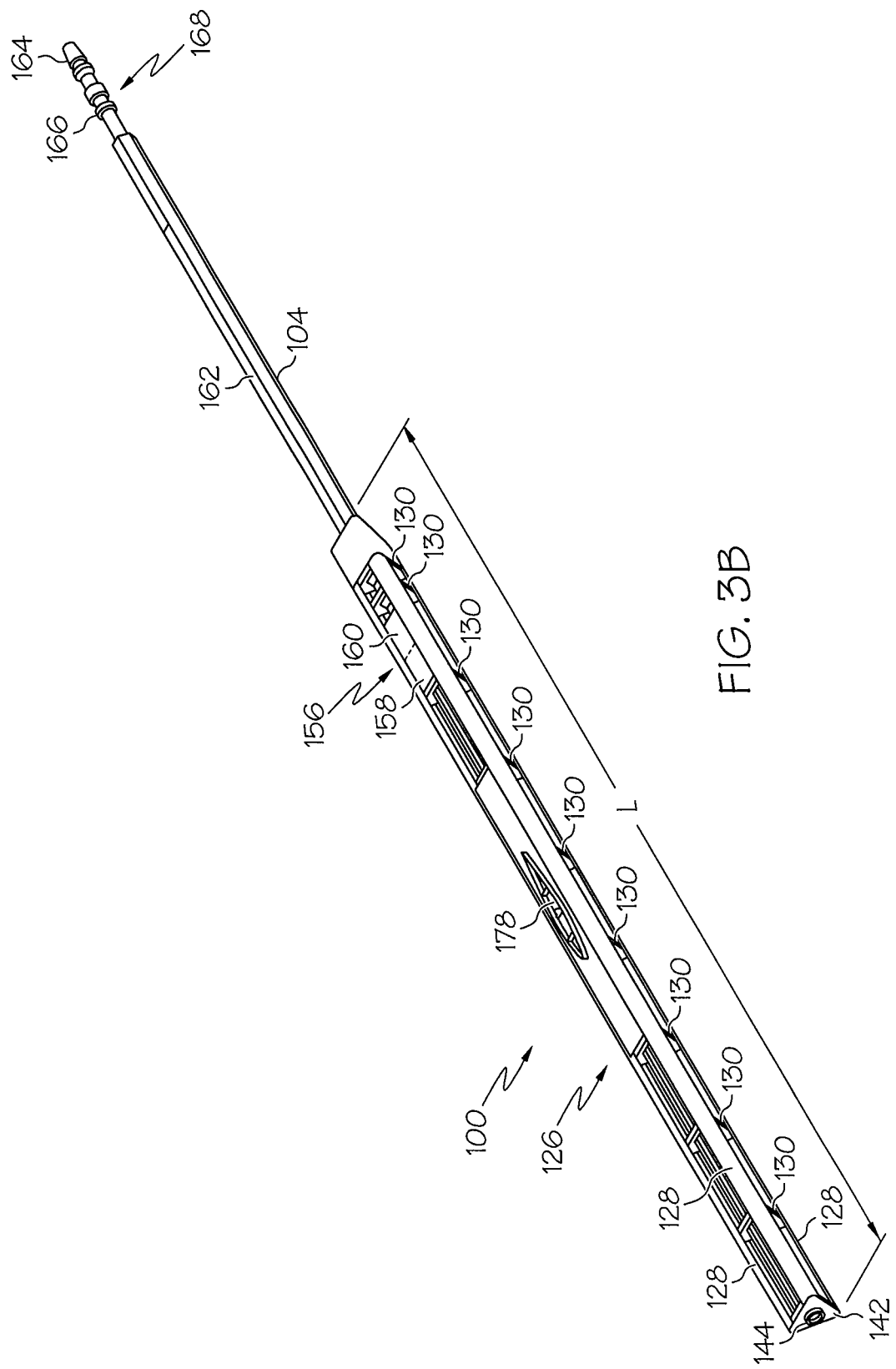
FIG. 3B is a detailed perspective view of the refueling boom with the telescoping boom section in an extended position in accordance with an embodiment of the present disclosure.

FIG. 3A is a detailed perspective view of the refueling boom 100 or refueling boom assembly with the telescoping boom section 104 in a retracted position in accordance with an embodiment of the present disclosure. FIG. 3B is a detailed perspective view of the refueling boom assembly 100 with the telescoping boom section 104 in an extended position in accordance with an embodiment of the present disclosure. A skin 172 or cover has been omitted in FIGS. 3A and 3B for purposes of illustrating and describing the internal details of the refueling boom assembly 100. The refueling boom assembly 100 may include a main boom section 126 and a hollow telescoping boom section 104 for transporting fuel. The telescoping boom section 104 may be adapted to be moved between the retracted position within the main boom section 126 as illustrated in FIG. 3A and an extended position extending from the main boom section 126 as illustrated in FIG. 3B for in-flight refueling of an aircraft 107 similar to that illustrated in FIG. 1A.

Figure 5:
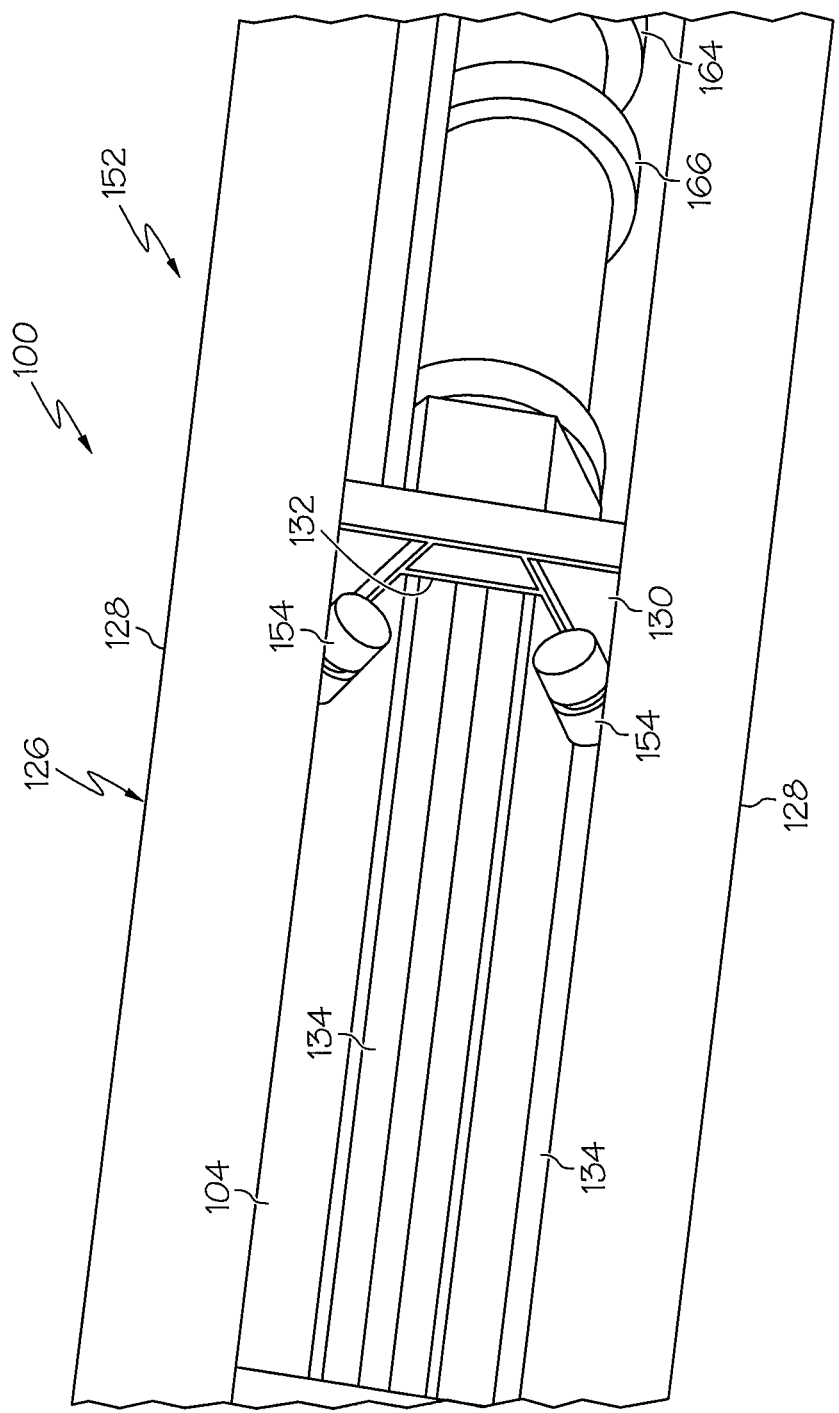
FIG. 5 is a detailed perspective view of an aft portion of the refueling boom and telescoping boom section in accordance with an embodiment of the present disclosure.
Figure 6:
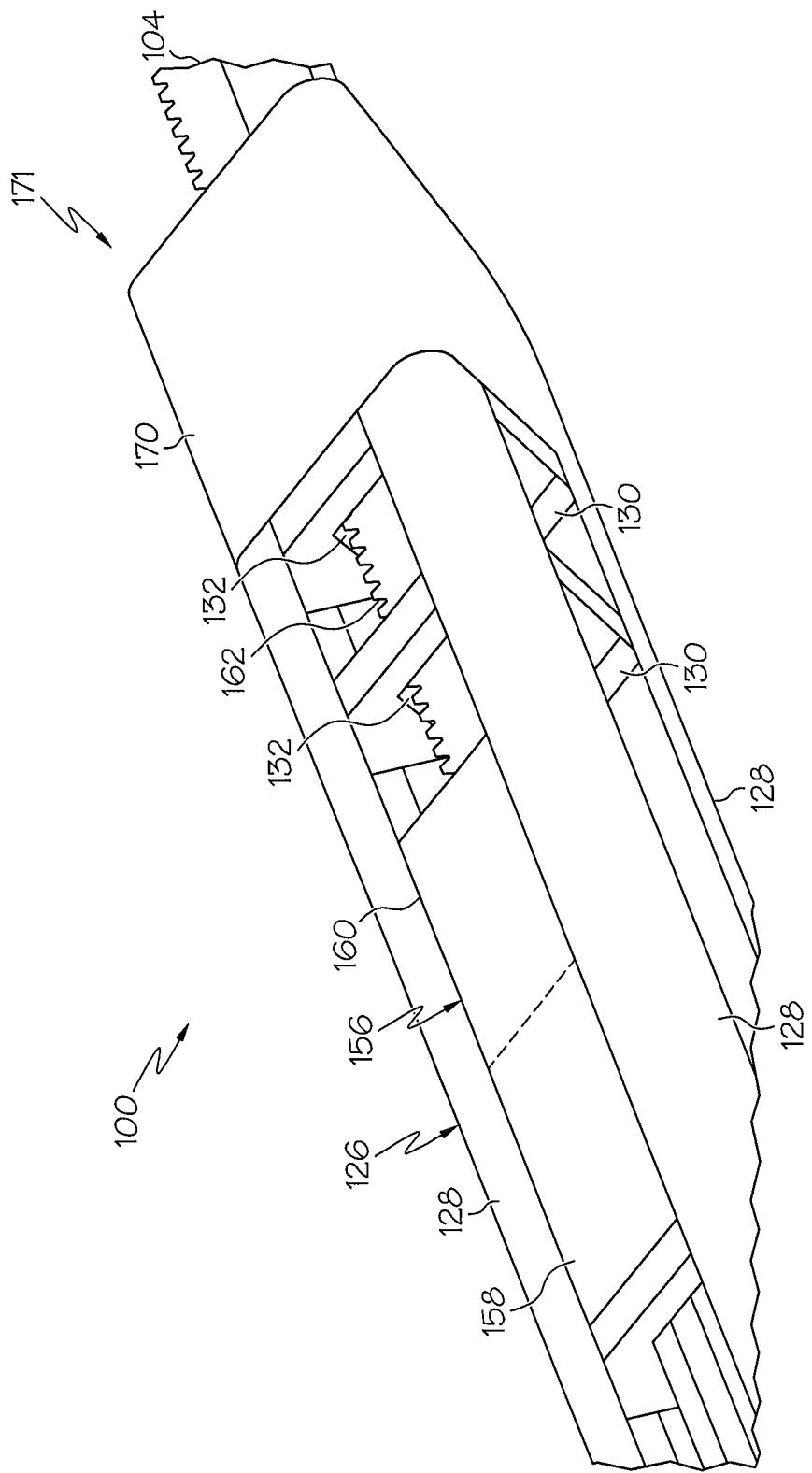
FIG. 6 is a detailed perspective view of a portion the refueling boom containing a mechanism for extending and retracting the telescoping boom section in accordance with an embodiment of the present disclosure.

The main boom section 126 may include a plurality of outer longitudinal stiffeners 128. The outer longitudinal stiffeners 128 may extend linearly along a length L of the main boom section 126. A plurality of structural bulkheads 130 may be positioned at predetermined locations along the length L of the main boom section 126. Each structural bulkhead 130 may include a center opening 132, as best illustrated in FIGS. 5 and 6, through which the telescoping boom section 102 is moveable. Each of the plurality of outer longitudinal stiffeners 128 may be attached to each of the structural bulkheads 130.

The main boom section 126 may also include a plurality of inner longitudinal stiffeners 134. The inner longitudinal stiffeners 134 may extend linearly along the length L of the main boom section 126. Each inner longitudinal stiffener 134 may extend through the center opening 132 of each structural bulkhead 130 and may be attached thereto.

As illustrated in FIGS. 3A and 3B, the main boom section 126 may include a substantially triangular shaped cross-section along its longitudinal extent. The triangular shaped cross-section may define an equilateral triangle. The main boom section 126 may include three outer longitudinal stiffeners 128 extending linearly substantially completely along the length of the main boom section 126. Each outer longitudinal stiffener 128 may define a vertex of the substantially triangular shaped cross-section of the main boom 126. Each outer longitudinal stiffener 128 may be substantially V shaped with a curved or rounded bottom portion.

The structural bulkheads 130 may also be substantially triangular shaped corresponding to the cross-section of the main boom section 126. Each of the outer longitudinal stiffeners 128 may be attached to a vertex of each structural bulkhead 130. Each vertex of the structural bulkheads 130 may be curved or rounded to substantially conform to the curved or rounded shape of the outer longitudinal stiffeners 128 for mating attachment of the outer longitudinal stiffeners 128 to each of the vertexes of the bulkheads 130.

The outer longitudinal stiffeners 128, bulkheads 130 and inner structural stiffeners 134 may be made from a lightweight material with sufficient strength to withstand the forces associated with in-flight refueling. For example, the components may be made from a composite material, metal, alloy or any combination of these materials.

Figure 4:
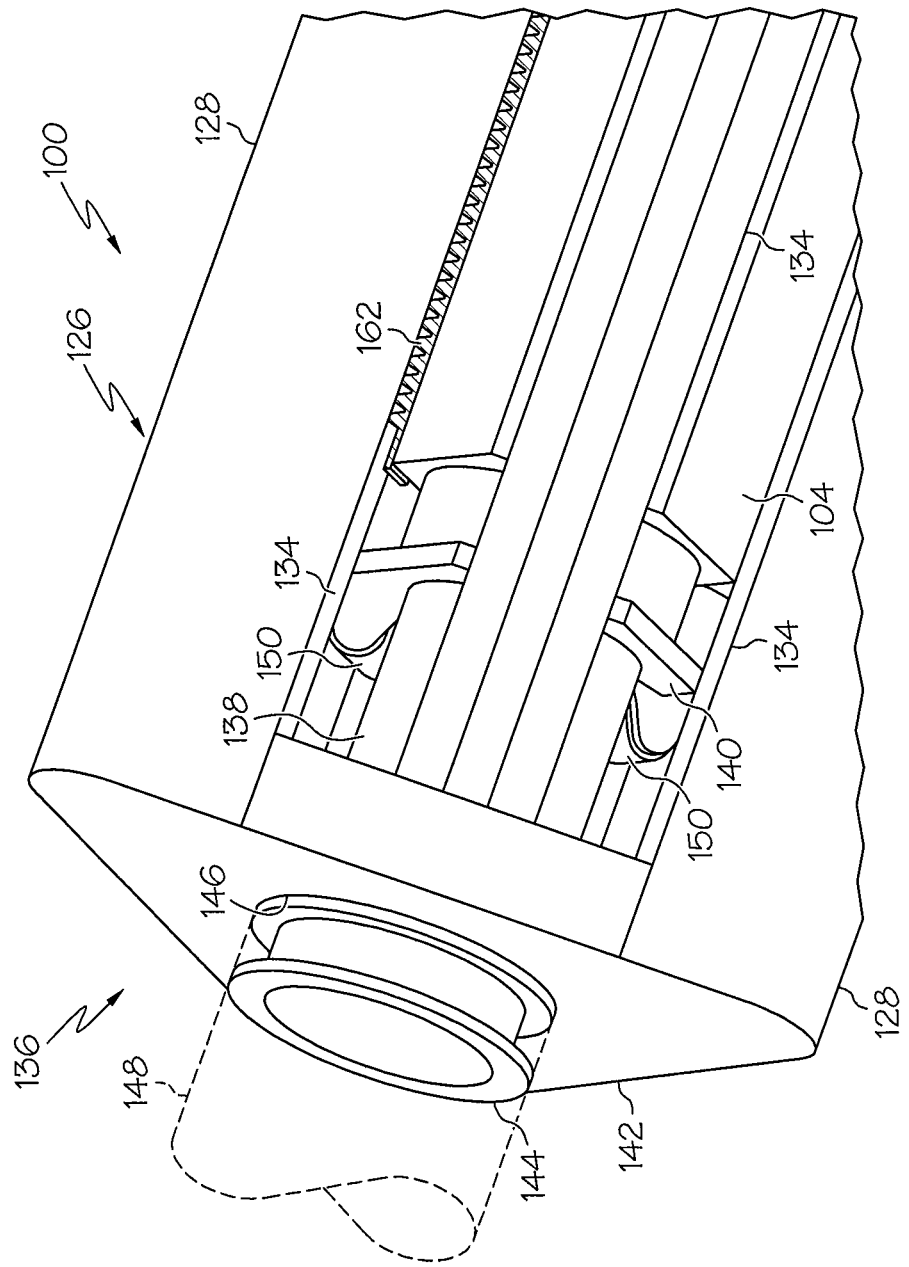
FIG. 4 is a detailed perspective view of a forward portion of the refueling boom and telescoping boom section in accordance with an embodiment of the present disclosure.

Referring also to FIG. 4, FIG. 4 is a detailed perspective view of a forward portion 136 of the refueling boom 100 and telescoping boom section 104 in accordance with an embodiment of the present disclosure. A fuel tube 138 may be inserted into the telescoping boom section 104. The fuel tube 138 may be rigid tube made from a suitable material capable of transporting aircraft engine fuel. The telescoping boom section 104 is slidable along the fuel tube 138 when the telescoping boom section 104 is moved between the retracted and extended positions. A slidable seal 140 may interface between the fuel tube 138 and the telescoping boom section 104. The slidable seal 140 has sufficient sealing capacity to withstand the expected fuel pressures associated with in-flight refueling.

The fuel tube 138 may be slightly shorter than the telescoping boom section 104 and may extend substantially the complete length of the telescoping boom section 104 within and coaxially with the telescoping boom section 104 when the telescoping boom section 104 is retracted within the main boom section 126.

The main boom section 126 may also include a forward end bulkhead 142 attached to the outer longitudinal stiffeners 128 and the inner longitudinal stiffeners 134 at an end of the main boom section 126 proximate to the pivot assembly 102 (FIG. 2). A fuel fitting 144 may be attached to a center opening 146 of the forward end bulkhead 142. The fuel fitting 144 may receive a fuel line 148 (shown in phantom in FIG. 4) from the tanker aircraft 106 and may couple or connect the fuel line 148 to the fuel tube 138.

A set of forward rollers 150 may be rotatably mounted to a forward end the telescoping boom section 104. The forward rollers may rotatably ride against the inner longitudinal stiffeners 134 when the telescoping boom section 104 is moved between the retracted and extended positions. The forward rollers 150 may be fixedly mounted, biased or spring mounted or a combination thereof to maintain contact with the inner longitudinal stiffeners 134 and to provide smooth non-binding movement of the telescoping boom section 104 between retracted and extended positions.

Referring to FIG. 5, FIG. 5 is a detailed perspective view of an aft portion 152 of the refueling boom 100 and telescoping boom section 104 in accordance with an embodiment of the present disclosure. A set of after rollers 154 may be rotatably mounted to the main boom section 126 proximate to an aft end of the main boom section 126. Each of the set of after rollers 154 may be adapted for rolling contact against the telescoping boom section 104 to support and align the telescoping boom section 104 when the telescoping boom section is moved between the retracted and extended positions. The set of after rollers 154 may be fixedly mounted, biased or spring mounted or a combination thereof to provide smooth non-binding movement of the telescoping boom section 104. Other sets of rollers or other devices may be employed as needed to facilitate operation of the telescoping boom section 104. All sets of rollers 150 and 154 may use spherical bearings between the roller elements to accommodate lateral axis variations in a profile of the telescoping boom section 104. At least one of the sets of rollers 150 and 154 and/or one roller in each set of rollers 150 and 154 may be biased or spring loaded against the telescoping boom section 104 to accommodate longitudinal variation such as bow or sag.

FIG. 6 is a detailed perspective view of a portion the refueling boom 100 containing a mechanism 156 for extending and retracting the telescoping boom section 104 in accordance with an embodiment of the present disclosure. The mechanism 156 for extending and retracting the telescoping boom section 104 may include a motor 158 and gearbox 160 mounted to the main boom section 126. The motor 158 and gearbox 160 may be a single integrated unit or separate components. The mechanism 156 for extending and retracting the telescoping boom section 104 may also include a gear rack 162 mounted to the telescoping boom section 104. The motor 158 and gearbox 160 are mechanically coupled to the gear rack 162 to move the telescoping boom section 104 between the retracted and extended positions. The gearbox 160 may include a pinion gear adapted to mesh with the rack gear 162 for driving the rack gear 162 to move the telescoping boom section 104 between the retracted and extended positions.

The telescoping boom section 104 may have a structure with multiple flat sides. For example, the telescoping boom section 104 may have a hexagonal exterior shape or hexagonal cross-section. The hexagonal shape facilitates locating fixtures or jigs for penetration locations and the six integral flat sides facilitate roller contact, such as rollers 154 as described above. Additionally, the gear rack 162 may be mounted on one flat side of a hexagonally shaped telescoping boom section 104.

As shown in FIG. 3B, a refueling nozzle 164 and shock absorber 166 are attached to an aft end 168 of the telescoping boom section 104. The refueling nozzle 164 is adapted to releasably couple the telescoping boom section 104 to an aircraft fuel receptacle for in-flight refueling of the aircraft (not shown). The refueling nozzle 164 may be similar to those currently being used on tanker aircraft.

As best shown in FIG. 6, an ice shield 170 may be mounted to an aft end 171 of the main boom section 126. The ice shield 170 may protect the refueling nozzle 164 from accumulating ice when the telescoping boom section 104 is in the retracted position. The ice shield may be heated to prevent ice formation.

The main boom section 126 may include a skin 172 or outer cover or shield (FIG. 2) disposed over the outer longitudinal stiffeners 128. The skin 172 protects the internal components of the aerial refueling boom 100 and provides a streamlined aerodynamic shape. The skin may be a lightweight metal material, such as aluminum, a lightweight alloy or other material useable in manufacturing aircraft fuselages, wings and control surfaces. Access panels (not shown) may be provided in selected locations in the skin 172 to provide access to internal components for maintenance and repair.

Referring back to FIGS. 1A and 1B, the aerial refueling boom 100 may also include a refueling boom mechanism 174. The hoist mechanism 174 may be used to raise the refueling boom 100 from a lowered position as illustrated in FIG. 1A to a stowed position as illustrated in FIG. 1B in the event there is a malfunction or problem with the boom pivot assembly 102. Under normal operating conditions, the boom pivot assembly 102 is intended to operate the refueling boom 100 between the stowed position, adjacent the tanker aircraft (FIG. 1B), and the lowered position (FIG. 1A) for performing a refueling operation.

The refueling boom hoist mechanism 174 may include a cable 176 attached to the main boom section 126. A streamlined aerodynamic fairing 178 may be mounted on the main boom section 126 surrounding a connection of the refueling hoist cable 176. The fairing 178 is configured to substantially minimize drag and any other adverse aerodynamic effects causable by the refueling boom hoist mechanism 174 when in the lowered position for in-flight refueling.

Figure 7:
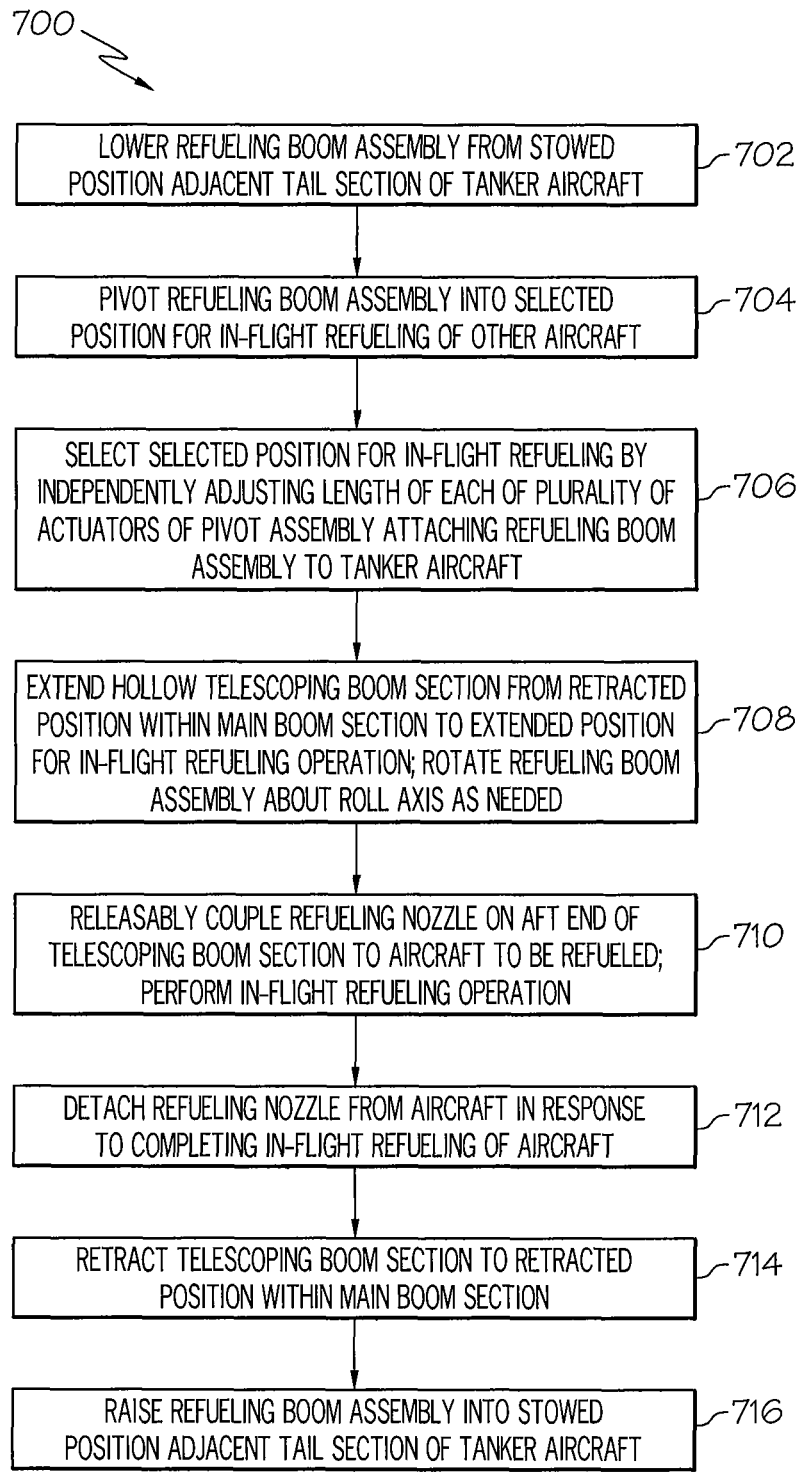
FIG. 7 is a flow chart of an example of a method for in-flight refueling of an aircraft in accordance with an embodiment of the present disclosure.

FIG. 7 is a flow chart of an example of a method 700 for in-flight refueling of an aircraft in accordance with an embodiment of the present disclosure. The method 700 may be performed by the aerial in-flight refueling system described with reference to FIG. 1A-6. In block 702, a refueling boom assembly may be lowered from a stowed position adjacent a tail section of a tanker aircraft. The refueling boom assembly may be lowered by a pivot assembly, such as pivot assembly 102.

In block 704, the refueling boom assembly may be pivoted into a selected position for in-flight refueling of another aircraft or a receiving aircraft. In block 706, the selected position for in-flight refueling may be selected by independently adjusting a link of each of a plurality of actuators of a pivot assembly that attaches the refueling boom assembly to the tanker aircraft. The selected position for in-flight refueling may be selected by independently adjusting a length of 6 actuators to provide 6 degrees of freedom of motion of the refueling boom assembly and to eliminate a need for airfoil control surfaces being attached to the refueling boom. The length of each actuator may be variable to provide movement of the refueling boom assembly in both azimuth and elevation about a virtual pivot point.

In block 708, a hollowed telescoping boom section may be extended from a retracted position within a main boom section of the refueling boom assembly to an extended position for an in-flight refueling operation. The refueling boom assembly may also be rotated by a actuator or allowed to rotate about a roll axis of the refueling boom assembly extending through a center line of a longitudinal extent of the refueling boom to provide additional degrees of freedom of motion of the refueling boom assembly and to further allow elimination of the need for airfoil control surfaces as used on current refueling booms.

In block 710, a refueling nozzle on an aft end of the telescoping boom section may be releasably coupled to the aircraft to be refueled. The in-flight refueling operation may then be performed. In block 712, the refueling nozzle may be detached from the aircraft in response to completing the in-flight refueling of the aircraft.

In block 714, the telescoping boom section may be retracted to its retracted position within the main boom section of the aerial refueling boom assembly. In block 716, the refueling boom assembly may be raised into the stowed position adjacent the tail section of the tanker aircraft. The boom assembly may be raised by the pivot assembly. In the event of a malfunction of the pivot assembly, the refueling boom assembled may be raised or hoisted by a hoist mechanism similar to that previously described.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. An aerial refueling boom, comprising:
   a refueling boom assembly, the refueling boom assembly comprising:
   a main boom section; and
   a hollow telescoping boom section adapted to be moved between a retracted position within the main boom section and an extended position extending from the main boom section for in-flight refueling of an aircraft;
   a pivot assembly for attaching the aerial refueling boom to a tanker aircraft, wherein the pivot assembly comprises:
   an aircraft attachment plate to attach the pivot assembly to the tanker aircraft;
   a refueling boom attachment plate at a forward end of the refueling boom assembly; and
   a plurality of actuators pivotably coupling the aircraft attachment plate to the refueling boom attachment plate, wherein each actuator includes a first end pivotably attached to the aircraft attachment plate and a second end pivotably attached directly to the refueling boom attachment plate at the forward end of the refueling boom assembly to pivotably attach the refueling boom assembly to the pivot assembly, and each actuator being independently controllable to vary a length of each actuator to provide multiple degrees of freedom of motion of the aerial refueling boom.

2. The aerial refueling boom of claim 1, further comprising an offset adapter to provide a structural interface between the pivot assembly and the refueling boom assembly, wherein the offset adapter comprises a structure to allow the aircraft attachment plate to be attached substantially horizontally to the tanker aircraft.

3. The aerial refueling boom of claim 2, further comprising:
   a roller bearing to couple the refueling boom assembly to the offset adapter to allow the aerial refueling boom to rotate about a roll axis of the aerial refueling boom extending through a centerline of a longitudinal extent of the refueling boom; and
   a roller bearing actuator mechanically coupled to the roller bearing to rotate the aerial refueling boom about the roll axis of the aerial refueling boom.

4. The aerial refueling boom of claim 1, wherein the plurality of actuators comprises six actuators to provide six degrees of freedom of motion of the aerial refueling boom and to eliminate a need for airfoil control surfaces being attached to the aerial refueling boom, wherein the length of each actuator is variable to provide movement of the refueling boom in both azimuth and elevation about a virtual pivot point.

5. The aerial refueling boom of claim 1, wherein the main boom section comprises:
   a plurality of outer longitudinal stiffeners extending linearly along a length of the main boom section;
   a plurality of structural bulkheads positioned at predetermined locations along the length of the main boom section, each structural bulkhead including a center opening through which the telescoping boom section is moveable, and each of the plurality of outer longitudinal stiffeners being attached to each of the structural bulkheads; and
   a plurality of inner longitudinal stiffeners each extending linearly along the length of the main boom section, each inner longitudinal stiffener extending through the center opening of each structural bulkhead and being attached thereto.

6. The aerial refueling boom of claim 5, further comprising:
   a fuel tube inserted into the telescoping boom section, wherein the telescoping boom section is slidable along the fuel tube when the telescoping boom section is moved between the retracted and extended positions;
   a forward end bulkhead attached to the outer longitudinal stiffeners and the inner longitudinal stiffeners at an end of the main boom section proximate to the pivot assembly;
   a fuel fitting disposed in a center opening of the forward end bulkhead for receiving a fuel line from the tanker aircraft and for coupling the fuel line to the fuel tube.

7. The aerial refueling boom of claim 5, further comprising:
   a set of after rollers rotatably mounted to the main boom section proximate to an aft end of the main boom section, each of the set of after rollers being adapted for rolling contact against the telescoping boom section to support and align the telescoping boom section when the telescoping boom section is moved between the retracted and extended positions; and
   a set of forward rollers rotatably mounted to a forward end the telescoping boom section for riding against the inner longitudinal stiffeners when the telescoping boom section is moved between the retracted and extended positions.

8. The aerial refueling boom of claim 1, further comprising:
   a motor and gearbox mounted to the main boom section; and
   a gear rack mounted to the telescoping boom section, wherein the motor and gearbox are mechanically coupled to the gear rack to move the telescoping boom section between the retracted and extended positions.

9. The aerial refueling boom of claim 8, wherein the telescoping boom section comprises a hexagonal exterior shape and the gear rack is mounted on one flat side of the telescoping boom section.

10. The aerial refueling boom of claim 1, further comprising:
    a refueling nozzle attached to an aft end of the telescoping boom section, the refueling nozzle being adapted to releasably couple the telescoping boom section to an aircraft fuel receptacle for in-flight refueling of the aircraft; and
    an ice shield mounted to an aft end of the main boom section to protect the refueling nozzle when the telescoping boom section is in the retracted position.

11. The aerial refueling boom of claim 1, further comprising:
- a refueling boom hoist mechanism to raise the refueling boom between a lowered position for in-flight refueling to a stowed position in event of a malfunction of the pivot assembly; and
- a streamlined aerodynamic fairing mounted on the main boom section and surrounding a connection of the refueling hoist mechanism to substantially minimize drag and any other adverse aerodynamic effects causable by the refueling boom hoist mechanism when in the lowered position for in-flight refueling.

12. The aerial refueling boom of claim 1, wherein the main boom section comprises a substantially triangular shaped cross-section along its longitudinal extent, the main boom section comprising:
- three outer longitudinal stiffeners extending linearly along a length of the main boom section, each outer longitudinal stiffener defining a vertex of the substantially triangular shaped cross-section of the main boom; and
- a plurality of substantially triangular shaped structural bulkheads positioned at predetermined locations along the length of the main boom section, each structural bulkhead including a center opening through which the telescoping boom section is moveable, and each of the outer longitudinal stiffeners being attached to a vertex of each structural bulkhead.

13. An aerial refueling boom, comprising:
- a pivot assembly for attaching the aerial refueling boom to a tanker aircraft;
- a refueling boom assembly, the refueling boom assembly comprising:
- a main boom section; and
- a hollow telescoping boom section adapted to be moved between a retracted position within the main boom section and an extended position extending from the main boom section for in-flight refueling of an aircraft, wherein the main boom section comprises:
- a plurality of outer longitudinal stiffeners extending linearly along a length of the main boom section;
- a plurality of structural bulkheads positioned at predetermined locations along the length of the main boom section, each structural bulkhead including a center opening through which the telescoping boom section is moveable, and each of the plurality of outer longitudinal stiffeners being attached to each of the structural bulkheads; and
- wherein the pivot assembly comprises:
- an aircraft attachment plate to attach the pivot assembly to the tanker aircraft; and
- a refueling boom attachment plate at a forward end of the refueling boom assembly;
- a plurality of actuators pivotably coupling the aircraft attachment plate to the refueling boom attachment plate, the plurality of actuators being pivotably directly attached to refueling boom attachment plate at the forward end of the refueling boom assembly to pivotably attach the refueling boom assembly to the pivot assembly.

14. The aerial refueling boom of claim 13, further comprising a plurality of inner longitudinal stiffeners extending linearly along the length of the main boom section, each inner longitudinal stiffener extending through the center opening of each structural bulkhead and being attached thereto.

15. The aerial refueling boom of claim 13, wherein the pivot assembly further comprises:
- wherein each actuator includes a first end pivotably attached to the aircraft attachment plate and a second end pivotably attached to the refueling boom attachment plate and each actuator being independently controllable to vary a length of each actuator to provide multiple degrees of freedom of motion of the aerial refueling boom.

16. The aerial refueling boom of claim 13, wherein the main boom section comprises a substantially triangular shaped cross-section along its longitudinal extent, the main boom section comprising:
- three outer longitudinal stiffeners extending linearly along a length of the main boom section, each outer longitudinal stiffener defining a vertex of the substantially triangular shaped cross-section of the main boom; and
- a plurality of substantially triangular shaped structural bulkheads positioned at predetermined locations along the length of the main boom section, each structural bulkhead including a center opening through which the telescoping boom section is moveable, and each of the outer longitudinal stiffeners being attached to a vertex of each structural bulkhead.

17. An aerial refueling boom, comprising:
- a refueling boom assembly, the refueling boom assembly comprising:
- a main boom section; and
- a hollow telescoping boom section adapted to be moved between a retracted position within the main boom section and an extended position extending from the main boom section for in-flight refueling of an aircraft;
- a pivot assembly for attaching the aerial refueling boom to a tanker aircraft and
- an offset adapter at a forward end of the refueling boom assembly, the offset adapter providing a structural interface between the pivot assembly and the refueling boom assembly, wherein the offset adapter comprises a structure to allow the pivot assembly to be attached substantially horizontally to the tanker aircraft;
- wherein the pivot assembly comprises:
- an aircraft attachment plate to attach the pivot assembly to the tanker aircraft;
- a refueling boom attachment plate directly attached to the offset adapter at the forward end of the refueling boom assembly, the refueling boom attachment plate pivotably attaching the refueling boom assembly to the pivot assembly; and
- a plurality of actuators pivotably coupling the aircraft attachment plate to the refueling boom attachment plate, wherein each actuator includes a first end pivotably attached to the aircraft attachment plate and a second end pivotably attached to the refueling boom attachment plate and each actuator being independently controllable to vary a length of each actuator.

18. The aerial refueling boom of claim 17, further comprising a roller bearing to couple the refueling boom assembly to the offset adapter to allow the aerial refueling boom to rotate about a roll axis of the aerial refueling boom extending through a centerline of a longitudinal extent of the refueling boom.

19. The aerial refueling boom of claim 18 further comprising a roller bearing actuator mechanically coupled to the roller bearing to rotate the aerial refueling boom about the roll axis of the aerial refueling boom.

20. A method for in-flight refueling of an aircraft, comprising:
- pivoting a refueling boom assembly into a selected position for in-flight refueling of the aircraft;
- selecting the selected position for in-flight refueling by independently adjusting a length of each of a plurality of actuators of a pivot assembly attaching the refueling boom assembly to a tanker aircraft, wherein the pivot assembly comprises:
- an aircraft attachment plate to attach the pivot assembly to the tanker aircraft;
- a refueling boom attachment plate attached at a forward end of the refueling boom assembly, the refueling boom attachment plate attaching the refueling boom assembly to the pivot assembly, the plurality of actuators pivotably coupling the aircraft attachment plate to the refueling boom attachment plate, wherein each actuator includes a first end pivotably attached to the aircraft attachment plate and a second end pivotably attached directly to the refueling boom attachment plate at the forward end of the refueling boom assembly to pivotably attach the refueling boom assembly to the pivot assembly, and each actuator being independently controllable to vary a length of each actuator; and
- extending a hollow telescoping boom section from a main boom section of the refueling boom assembly, the hollow telescoping boom section comprising a refueling nozzle attached to an aft end of the telescoping boom section, the refueling nozzle being adapted to releasably couple the telescoping boom section to a fuel receptacle of the aircraft to be refueled in-flight.

21. The method of claim 20, wherein the plurality of actuators comprise six actuators and wherein selecting the selected position for in-flight refueling comprises independently adjusting a length of the six actuators to provide six degrees of freedom of motion of the refueling boom assembly and to eliminate a need for airfoil control surfaces being attached to the refueling boom, wherein the length of each actuator is variable to provide movement of the refueling boom assembly in both azimuth and elevation about a virtual pivot point.

22. The method of claim 21, further comprising rotating the refueling boom assembly about a roll axis of the refueling boom assembly extending through a centerline of a longitudinal extent of the refueling boom to provide an additional degree of freedom of motion of the refueling boom assembly.

23. The method of claim 20, wherein extending the hollow telescoping boom section comprises operating a motor and gearbox mounted to the main boom section to drive a gear rack mounted to the telescoping boom section, wherein the motor and gearbox are mechanically coupled to the gear rack to move the telescoping boom section between an extended position and a retracted position.

24. The aerial boom of claim 1, further comprising an offset adapter coupled to the forward end of the refueling boom, the refueling boom attachment plate being attached to a side of the offset adapter that extends from the forward end of the refueling boom.

* * * * *